United States Patent
Koizumi et al.

(10) Patent No.: US 6,477,323 B2
(45) Date of Patent: *Nov. 5, 2002

(54) SYSTEM AND METHOD FOR CONTINUOUSLY REPROCESSING WASTE SULFURIC ACID LIQUID, AND HEATER SUPPORTING STRUCTURE FOR HEATING A VESSEL MADE OF GLASS

(75) Inventors: Kiyohito Koizumi, Funabashi; Hiroshi Osuda, Kasugai; Toru Matoba, Kasugai; Masataka Fukuizumi, Kasugai; Takayuki Sadakata, Kawasaki, all of (JP)

(73) Assignee: Asahi Techno Glass Corporation, Funabashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 54 days.

(21) Appl. No.: 09/049,895

(22) Filed: Mar. 30, 1998

(65) Prior Publication Data
US 2001/0003555 A1 Jun. 14, 2001

(30) Foreign Application Priority Data

Mar. 31, 1997 (JP) ............................................... 9-081573
Nov. 21, 1997 (JP) ............................................... 9-320950

(51) Int. Cl.$^7$ ................................................. F24H 1/20
(52) U.S. Cl. ...................................... 392/455; 219/536
(58) Field of Search ............................... 202/154, 186, 202/267.1, 197, 185.6, 173, 160, 206; 203/80, 86, 73, 2, 1, DIG. 9; 423/531; 392/441–455, 507, 497; 219/523, 536, 538, 542, 546, 553

(56) References Cited

U.S. PATENT DOCUMENTS

| | | | | |
|---|---|---|---|---|
| 3,294,650 A | * | 12/1966 | Manteufel | 203/22 |
| 3,496,071 A | * | 2/1970 | Spence | 203/72 |
| 4,014,735 A | * | 3/1977 | Guth et al. | 159/DIG. 19 |
| 4,217,176 A | * | 8/1980 | Antony | 202/173 |
| 4,326,121 A | * | 4/1982 | Welsby et al. | 219/523 |
| 4,334,961 A | * | 6/1982 | Moen et al. | 202/173 |

(List continued on next page.)

FOREIGN PATENT DOCUMENTS

| | | | | |
|---|---|---|---|---|
| FR | 2448375 | * | 10/1980 | |
| SU | 1289521 | * | 2/1987 | |
| SU | 1581334 | * | 7/1990 | |
| WO | WO94/00720 | * | 1/1994 | F24H/1/10 |

Primary Examiner—Teresa Walberg
Assistant Examiner—Thor Campbell
(74) Attorney, Agent, or Firm—Oblon, Spivak, McClelland, Maier & Neustadt, P.C.

(57) ABSTRACT

A heating vessel for concentration is formed in an elongated one, and a baffle plate is arranged to increase sulfuric acid liquid concentration at an outlet to a high level. The heating vessel for concentration and a heating vessel for distillation are installed so that the respective heating vessels have substantially the same waste sulfuric acid liquid level therein, forming continuous flow of the sulfuric acid liquid without presence of a valve or an intermediate tank in a connecting pipe. The heating vessel for distillation is formed in an elongated one with a baffle plate arranged therein to increase the impurity concentration included in concentrated sulfuric acid liquid at an outlet to a high level. In addition, a heater inserted into a heating vessel made of glass is supported at two locations of an inserting portion and a leading portion of the heating vessel formed as a bulged portion, reducing stress concentration to the heater supporting portion due to vibration of the liquid in the heating vessel and vibration of the heating vessel per se.

3 Claims, 2 Drawing Sheets

U.S. PATENT DOCUMENTS

| | | | |
|---|---|---|---|
| 4,492,951 A | * | 1/1985 | Apothaker et al. .......... 338/316 |
| 4,828,660 A | | 5/1989 | Clark et al. |
| 5,032,218 A | | 7/1991 | Dobson |
| 5,061,348 A | * | 10/1991 | McCormick et al. ......... 203/40 |
| 5,113,057 A | * | 5/1992 | Tsai ............................ 219/523 |
| 5,155,800 A | * | 10/1992 | Rezabek et al. ............. 392/503 |
| 5,271,086 A | * | 12/1993 | Kamiyama et al. ......... 392/483 |
| 5,275,701 A | * | 1/1994 | Mazzafro et al. ............ 423/531 |
| 5,398,806 A | * | 3/1995 | Quinn ..................... 202/267.1 |
| 5,443,695 A | * | 8/1995 | Yuan .......................... 202/160 |
| 5,500,098 A | * | 3/1996 | Brown et al. .......... 423/DIG. 1 |
| 5,575,889 A | * | 11/1996 | Rosenblad .................... 159/49 |
| 5,740,315 A | * | 4/1998 | Onishi et al. ................ 392/489 |

* cited by examiner

SYSTEM AND METHOD FOR CONTINUOUSLY REPROCESSING WASTE SULFURIC ACID LIQUID, AND HEATER SUPPORTING STRUCTURE FOR HEATING A VESSEL MADE OF GLASS

BACKGROUND OF THE INVENTION

1. Field of the Invention

The present invention relates to a system and method for recovering spent or waste sulfuric acid liquid and reprocessing it, in particular a system and method for continuously reprocessing waste sulfuric acid liquid wherein sulfuric acid liquid which has enough concentration and impurity for reuse can be provided in a stable and continuous way. The present invention also relates to a heater supporting structure for a heating device made of glass, which is used as a heating device for corrosive liquid such as sulfuric acid and nitric acid.

2. Discussion of Background

In a semiconductor fabrication process, sulfuric acid liquid has been used for cleaning of wafers and removal of photo resists.

The waste sulfuric acid which has been used in such process has been disposed after neutralized, taken over to dealers for disposal of industrial waste, or concentrated and distilled for recycling.

As such systems for reprocessing waste sulfuric acid liquid have been known a continuous system including a concentration step and a distillation step which is disclosed in U.S. Pat. No. 3,294,650, and a batch processing system for production of reprocessed sulfuric acid liquid for batteries which is disclosed-in Intreprinderea Chemida "Dudesti" Rom. RO 83,474, May 30, 1984, application Ser. No. 103,545, Feb. 27, 1981; 3pp CA 1985, 103(4) 56183z.

As conventional systems for reprocessing waste sulfuric acid liquid have been known a normal pressure type apparatus which is operated at substantially atmospheric pressure, and a reduced pressure type apparatus which is provided with a vacuum device such as a vacuum pump and is operated under reduced pressure from a few Torr ($1 \times 10^3$ Pa) to tens of Torr ($5 \times 10^3$ Pa). Although a continuous system is adopted in such a normal pressure type apparatus because of easy removal of each liquid, the material of a gasket usable to pipe connecting portions for each liquid is limited because the operating temperature is 330° C. or higher. If the gasket is made of e.g. metal or carbon, there is a possibility that impurities might mix. If the operation is carried out without use of the gasket for that reason, there has been created a problem in that the apparatus and pipes could be broken by occurrence of leakage of each liquid at the connecting portions and difficulty in absorption of expansion and contraction of the system and the pipes due to a temperature difference.

In the conventional apparatuses, heating vessels are of a vertical type or a horizontal type without a baffle plate. In the concentration step, it has been unstable to concentrate the liquid to a target level. In order to cope with this problem in such a reduced pressure type apparatus, there have been adapted a semi-batch system wherein the process flow is cut off so that concentrated sulfuric acid liquid from a concentrating vessel is held in an intermediate tank and is transferred into the distillation step after determining the concentration of the concentrated sulfuric acid liquid in the intermediate tank, or a system wherein switching to the distillation operation is made after finding the concentration state by estimating the concentration state based on an evaporating temperature in a batch system or by measuring the concentration of the concentrated sulfuric acid liquid which is taken out of the concentrating vessel through a branch pipe and is cooled. Such an normal pressure type apparatus has created a problem in that the apparatus and the pipes are quite likely to be broken because the evaporating temperature is remarkably raised to a specified value or higher to maintain high concentration. The normal pressure apparatus is insufficient in terms of stable and continuous operation.

As the heating vessel for concentrating or distilling corrosive liquid such as sulfuric acid or nitric acid is usually used a heating vessel made of the in terms of corrosion resistance.

As the heating source for such a heating vessel have been used hot water, steam, heat medium and electricity. The heating vessel has been heated by such a heating source from within, from outside or from within and outside. The heating from within has usually been adopted since the heating from outside creates a problem in that there is much heat loss due to radiation of heat.

When the heating is carried out from within, there has been adopted a supporting structure wherein a heater to be provided in the heating vessel is supported only by a heater inserting portion of the heating vessel in a cantilevered way.

Since there is a possibility that such a supporting structure could break the heater or the heating vessel made of glass, it is required that the heater have a length less than 1000 mm or the inside of the heating vessel be slowly heated so as to prevent the liquid in the vessel for vibrating. If there is no other way but to heat the inside of the vessel intensely, the heater and the vessel have been used being ready for breakage, which has required that the heater and the vessel are repaired or exchanged with new ones periodically.

Although it is proposed that a plurality of short heaters are arranged to cope with this problem, this proposal requires that the heating vessel must become larger, creating a problem in terms of apparatus cost.

SUMMARY OF THE INVENTION

It is an object of the present invention to solve the problems of the prior art.

The foregoing and other objects of the present invention have been attained by providing a system for continuously reprocessing waste sulfuric acid liquid, comprising:

an apparatus for concentration including
  a heating vessel for concentration having a supply device for continuously supplying waste sulfuric acid liquid thereto, an inlet for receiving the waste sulfuric acid liquid, and a heating device, and
  a condenser for cooling and condensing vaporized sulfuric acid led out of the heating vessel;
an apparatus for distillation including
  a heating vessel for distillation having an inlet for continuously receiving concentrated sulfuric acid liquid, and a heating device, and
  a condenser for distillation for cooling and condensing vaporized sulfuric acid led out of the heating vessel for distillation; and
  a connecting pipe for continuously removing the concentrated sulfuric acid liquid through a bottom of the heating vessel for concentration and supplying the concentrated sulfuric acid liquid to the heating vessel for distillation;

wherein the heating vessel for concentration is elongated in a horizontal direction, and the heating vessel for concentration has a baffle plate provided therein so that the sulfuric acid liquid which is supplied through the inlet of the heating vessel for concentration is gradually concentrated so as to have higher concentration at an outlet of the heating vessel for concentration than concentration at the inlet of the heating vessel for concentration.

The present invention also provides a method for continuously reprocessing waste sulfuric acid liquid, comprising:

concentrating waste sulfuric acid liquid by an apparatus for concentration including
  a heating vessel for concentration having a supply device for continuously supplying waste sulfuric acid liquid thereto, an inlet for receiving the waste sulfuric acid liquid, and a heating device, and
  a condenser for cooling and condensing vaporized sulfuric acid let out of the heating vessel; and
distilling the concentrated waste sulfuric acid liquid by an apparatus for distillation including
  a heating vessel for distillation having an inlet for continuously receiving the concentrated sulfuric acid liquid, and a heating device, and
  a condenser for distillation for cooling and condensing vaporized sulfuric acid let out of the heating vessel for distillation;
  wherein the heating vessel for concentration is elongated in a horizontal direction, and the heating vessel for concentration has a baffle plate provided therein so that the sulfuric acid liquid which is supplied through the inlet of the heating vessel for concentration is gradually concentrated so as to have higher concentration at an outlet of the heating vessel for concentration than concentration at the inlet of the heating vessel for concentration.

In order to control the operation of the heating vessel for concentration, the heating vessel for concentration may be provided with a liquid level measuring device having a liquid level detector for sulfuric acid liquid, and may have the outlet for the concentrated sulfuric acid liquid provided with a temperature detector. As such a liquid level detector may be used a capacitance-operated liquid level detector. The heating vessel for concentration may have an outer surface formed with a liquid level gauge pipe, which is incorporated into an optical liquid level sensor using infrared rays as the liquid level sensor.

It is preferable that the heating vessel for concentration has a packing material layer arranged at an upper portion therein, and a partial condenser for vaporized sulfuric acid is arranged above the packing material layer.

In order to remove the condensed liquid in the apparatus for concentration, there may be provided a condensed liquid receiving tank having a liquid inlet, a liquid outlet and a gas outlet, and a condensed removing tank having a liquid inlet, a liquid outlet, a gas inlet and a gas outlet and having valves in the inlets and the outlets. In the removal of the condensed liquid, gas which is led into the condensed removing tank and has pressure not less than normal pressure may be nitrogen gas which has been cleaned by a filter. A detector which detects that a predetermined volume of condensed liquid has been stored in the condensed liquid receiving tank may be an optical liquid level sensor using infrared rays. A time control may be adopted to repeat the removal at preset time intervals.

In the system for continuously reprocessing waste sulfuric acid liquid according to the present invention, at least one baffle plate which has a liquid passing hole formed therein may be provided between the inlet for the waste sulfuric acid liquid and the outlet for the concentrated sulfuric acid liquid in the heating vessel for concentration. A plurality of baffle plates may be provided in the heating vessel for concentration. A baffle plate may have a height shorter than that of the heating vessel for concentration, and the liquid level of the waste sulfuric acid liquid may be controlled to be slightly higher than the baffle plate, which allows the liquid to pass without provision of the liquid passing hole in the baffle plate.

In order to control the operation of the heating vessel for distillation, the heating vessel for distillation may be provided with a liquid level measuring device having a liquid level detector for the sulfuric acid liquid, and may have the outlet for the waste sulfuric acid liquid provided with a temperature detector. As the liquid level detector may be used a capacitance-operated liquid level detector. The heating vessel for distillation may have an outer surface formed with a liquid level gauge pipe, which is incorporated into an optical liquid level sensor using infrared rays as the liquid level sensor.

The heating vessel for distillation may have a packing material layer arranged at an upper portion therein, and a return pipe for condensed liquid of sulfuric acid may be provided above the packing layer material in the heating vessel for distillation to return the condensed liquid of sulfuric acid from the condenser for distillation. The return pipe for condensed liquid of sulfuric acid may have a valve or an orifice provided therein.

In order to remove the condensed liquid of sulfuric acid in the apparatus for distillation, there may be provided a condensed liquid receiving tank for sulfuric acid having a liquid inlet, a liquid outlet and a gas outlet, and a condensed liquid removing tank for sulfuric acid having a liquid inlet, a liquid outlet, a gas inlet and a gas outlet and having valves arranged in the inlets and the outlets. In the removal of the condensed liquid of sulfuric acid, gas which is led into the condensed liquid receiving tank and has pressure not less than normal pressure may be nitrogen gas which has been cleaned by a filter. A detector which detects that a predetermined volume of condensed liquid of sulfuric acid has been stored in the condensed liquid receiving tank may be an optical liquid level sensor using infrared rays. A time control may be adopted to repeat the removal at preset time intervals.

In the system for continuously reprocessing waste sulfuric acid liquid, a baffle plate which has a liquid passing hole formed therein may be arranged between the inlet for the concentrated sulfuric acid liquid and the outlet of the waste sulfuric acid liquid in the heating vessel for distillation. A plurality of baffle plates may be arranged in the heating vessel for distillation. A baffle plate may have a height shorter than that of the heating vessel for distillation, and the liquid level of the concentrated sulfuric acid liquid may be controlled to be slightly higher than the baffle plate, which allows the liquid to pass without provision of the liquid passing hole in the baffle plate.

In order to remove the waste sulfuric acid liquid in the apparatus for distillation, there may be provided a waste sulfuric acid receiving tank having a liquid inlet, a liquid outlet and a gas outlet, and a waste sulfuric acid removing tank having a liquid inlet, a liquid outlet, a gas inlet and a gas outlet and having valves arranged in the inlets and the outlets. In the removal of the waste sulfuric acid liquid, gas which is led into the waste sulfuric acid receiving tank and has pressure less than normal pressure may be nitrogen gas which has been cleaned by a filter. A detector which detects that a predetermined volume of sulfuric acid liquid has been stored in the waste sulfuric acid receiving tank may be an optical liquid level sensor using infrared rays. A time control may be adopted to repeat the removal at preset time intervals.

The system for continuously reprocessing waste sulfuric acid liquid may include an evacuation device which depressurizes the inside of the apparatus for concentration, the apparatus for distillation and the connecting pipe. Connecting portions of the connecting pipe with the apparatus for concentration and the apparatus for distillation may use a gasket made of fluorocarbon resin. In the system for continuously reprocessing waste sulfuric acid liquid, at least the condenser for distillation, the condensed liquid receiving tank for sulfuric acid, the condensed liquid removing tank for sulfuric acid and pipes for connecting these members in the apparatus for distillation may be made of silica glass.

In a preferred mode of the present invention, in the control of the heating vessel for concentration, the supply device for supplying waste sulfuric acid liquid to the heating vessel for concentration is controlled to regulate the supply of the waste sulfuric acid liquid based on the liquid level measured by the liquid level measuring device with the sulfuric acid liquid level detector, and the heating device of the heating vessel for concentration is controlled to regulate the temperature of the waste sulfuric acid liquid therein based on the temperature of the concentrated sulfuric acid liquid measured by the temperature measuring device with the temperature detector at the outlet for the concentrated sulfuric acid liquid in the heating vessel for concentration. The liquid level of the waste sulfuric acid liquid in the heating vessel for concentration can be regulated to be in a predetermined range of height so as to prevent a drop in the liquid level from causing the heating of the vessel in an empty state, to avoid insufficient evaporation and apparatus breakage due to a raise in the liquid level, and to adjust the flow of the liquid passing through the hole in the baffle plate. The concentrated sulfuric acid liquid can be heated to the boiling point for a predetermined concentration under temperature control. In that manner, the sulfuric acid liquid can be concentrated in a stable and continuous manner.

In a preferred mode of the present invention, the packing material layer which is provided in the apparatus for concentration works to catch sprays of waste sulfuric acid caused in generation of vaporized sulfuric acid, preventing the sprays entrained on the vaporized sulfuric acid from reaching the condenser. The partial condenser which is provided in the apparatus for concentration condenses part of the vaporized sulfuric acid, and work to return the condensed liquid of sulfuric acid to the heating vessel for concentration after the condensed liquid has wetted the packed layer, assisting the packed layer in catching the sprays. In that manner, the volume of the sulfuric acid included in the vapor which enters the vacuum device can be reduced to concentrate the waste sulfuric acid liquid in a stable and continuous way.

In a preferred mode of the present invention, the valves in the condensed liquid removing tank are controlled to be opened and closed in a preset order and at preset time intervals, removing the condensed liquid from a depressurized state into a normal pressure state. This allows the condensed liquid to be continuously received in the condensed liquid receiving tank without stopping the operation of the apparatus for concentration.

In a preferred mode of the present invention, if a plurality of baffle plates are arranged in the heating vessel for concentration, the function of the baffle plates is as follows: First, the waste sulfuric acid liquid which has been introduced into the heating vessel is stayed by a first baffle plate near to the inlet. Next, the waste sulfuric acid liquid is introduced into the space between the first baffle plate and a second baffle plate through the liquid passing hole in the first baffle plate, and the waste sulfuric acid liquid is stayed in the space between the first and second baffle plates. After such processes are repeated by the number of the baffle plates, the waste sulfuric acid liquid reaches the outlet for the concentrated sulfuric acid liquid in the heating vessel for concentration. Although the sulfuric acid concentration of the waste sulfuric acid liquid in the heating vessel for concentration is raised by evaporation due to heating, the reverse flow mixture of the waste sulfuric acid liquid through the liquid passing hole in the baffle plates is minimized in comparison with the absence of the baffle plates. The sulfuric acid concentration in the space between the first and second baffle plates becomes slightly higher than that at the inlet. After such an increase in the concentration is repeated by the number of the baffle plates, the waste sulfuric acid liquid reaches the outlet for the concentrated sulfuric acid liquid in the heating vessel for concentration, through which the concentrated sulfuric acid liquid having the concentration raised to a predetermined level is removed in a stable and continuous way. In that manner, the concentrated sulfuric acid liquid can be continuously supplied to the apparatus for distillation.

In a preferred mode of the present invention, in the control of the heating vessel for distillation, the waste sulfuric acid liquid supply device is controlled to regulate the supply of the waste sulfuric acid liquid based on the liquid level measured by the liquid level measuring device with the sulfuric acid liquid level detector, and the heating device for the heating vessel for distillation is controlled to regulate the evaporation quantity of the concentrated sulfuric acid liquid in the heating vessel for distillation based on the temperature of the concentrated sulfuric acid liquid measured by the temperature measuring device with the temperature detector in the outlet for the waste sulfuric acid liquid of the heating vessel. The liquid level of the concentrated sulfuric acid liquid in the heating vessel can be regulated to be in a predetermined range of height, preventing a drop in the liquid level from causing of heating of the heating vessel in an empty state, avoiding insufficient evaporation and apparatus breakage due to a raise in the liquid level, and adjusting the flow of the liquid passing through the hole in the baffle plate. In that way, the sulfuric acid liquid can be stably and continuously distilled.

In a preferred mode of the present invention, the packing material layer which is provided in the apparatus for distillation works to catch sprays of the concentrated sulfuric acid liquid caused in generation of vapor, preventing the sprays entrained on the vapor from reaching the condenser for distillation. The condensed sulfuric acid return pipe which is provided in the apparatus for distillation works to return the condensed sulfuric acid to the heating vessel for distillation after the condensed sulfuric acid has wetted the packed layer, assisting the packed layer in catching the sprays. The volume of the sprays which reach the condenser for distillation can be reduced to stably and continuously distill the sulfuric acid liquid.

In a preferred mode of the present invention, the valves of the condensed sulfuric acid removing tank are controlled to be opened and closed in a preset order and at preset time intervals, removing the condensed sulfuric acid from a depressurized state into a normal pressure state. This allows the condensed sulfuric acid to be continuously received into the condensed sulfuric acid receiving tank without stopping the operation of the apparatus for distillation.

When a plurality of baffle plates are arranged in the heating vessel for distillation, the function of the baffle plates is as follows: First, the concentrated sulfuric acid liquid is introduced through the inlet. Next, the concentrated sulfuric acid liquid is stayed by a first baffle plate near to the inlet. Then, the concentrated sulfuric acid liquid is introduced into the space between the first baffle plate and a second baffle plate through the liquid passing hole in the first baffle plate, and the concentrated sulfuric acid liquid is stayed in the space of the first and second baffle plates. After such processes are repeated by the number of the baffle plates, the concentrated sulfuric acid liquid reaches the outlet for the waste sulfuric acid liquid in the heating vessel for distillation. Although the impurity concentration of an unvolatile component in the concentrated sulfuric acid liquid is raised by evaporation due to heating in the heating vessel for distillation, reverse flow mixture of the concentrated sulfuric acid liquid through the liquid passing hole in the baffle plates can be minimized in comparison with the absence of the baffle plates. The impurity concentration of the concentrated sulfuric acid liquid between the first and second baffle plates becomes slightly higher than that at the inlet. After such an increase in the impurity concentration is repeated by the number of the baffle plates, the concentrated sulfuric acid liquid reach the outlet for the waste sulfuric acid liquid in the heating vessel for distillation, through which the waste sulfuric acid liquid with the impurity concentration raised can be stably and continuously removed. This allows the waste sulfuric acid liquid to be continuously supplied to the waste sulfuric acid receiving tank.

In a preferred mode of the present invention, the valves in the waste sulfuric acid removing tank are controlled so as to be opened and closed in a preset order and at preset time intervals, removing the waste sulfuric acid liquid from a depressurized state into a normal pressure state. This allows the waste sulfuric acid liquid to be continuously received in the waste sulfuric acid receiving tank without stopping the operation of the apparatus for distillation.

In a preferred mode of the present invention, the vacuum device works to keep a depressurized state in at least the apparatus for concentration, the apparatus for distillation and the connecting pipe so as to lower the boiling point of the sulfuric acid liquid, reducing the operating temperature. Gaskets which are made of material unlikely to accept impurities can be used in the connecting portions between the apparatus for concentration and the connecting pipe and between the apparatus for distillation and the connecting pipe so as to restrain the liquid from leaking and the respective portions from being damaged, establishing stable operation. If at least the condenser for distillation, the condensed sulfuric acid receiving tank, the condensed sulfuric acid removing tank and the connecting pipes therefor in the apparatus for distillation are made of silica glass, impurities can be restrained from eluting in the reprocessed sulfuric acid liquid, obtaining the reprocessed sulfuric acid liquid in a stable and continuous way.

According to another aspect of the present invention, there is provided a heater supporting structure for a heating device, comprising a heating vessel made of glass; and a heating device inserted in the heating vessel; wherein the heating device is supported at two locations of a heater inserting portion of the heating vessel and another location thereof so as to avoid breakage.

In a preferred mode of the present invention, the heater supporting structure may be constructed so that a leading edge of the heater opposite to the heater insertion portion is inserted in and supported by a bulged portion of the heating vessel. The heater supporting structure may be constructed so that the bulged portion has a cushiony sheath put therein and the leading edge is inserted into the sheath.

In a preferred mode of the present invention, the heater supporting structure may be constructed so that the cushiony sheath is made of PTFE or other fluorocarbon resin.

According to the present invention, the heater inserted into the heating vessel made of glass is supported by two portions of the heater inserting portion and the leading portion, and the stress concentration to the heater supporting portions which is caused by vibration of the liquid in the heating vessel or vibration of the heating vessel per se can be remarkably reduced in comparison with cantilevered supporting. This allows a long heater to be inserted, and breakage due to vibration of the liquid in the heating vessel or vibration of the heating vessel per se can be minimized, permitting intense heating to be carried out.

In the specification, the words "device" and "apparatus" have the same meaning as a word "unit", and the word "detector" has the same meaning as a word "sensor".

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
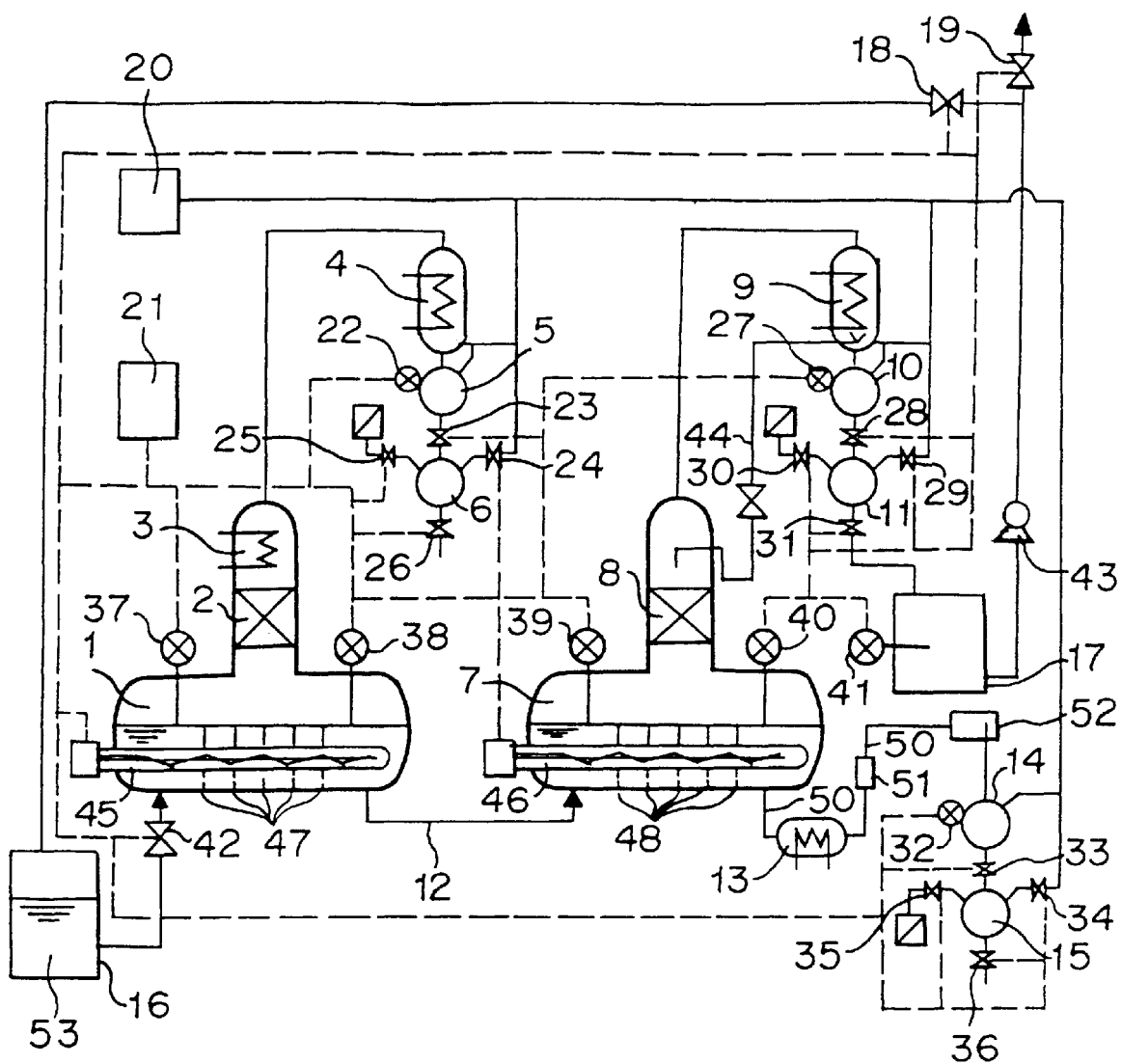
FIG. 1 is a flow chart showing an embodiment of the system for continuously reprocessing waste sulfuric acid liquid according to the present invention.
Figure 2:
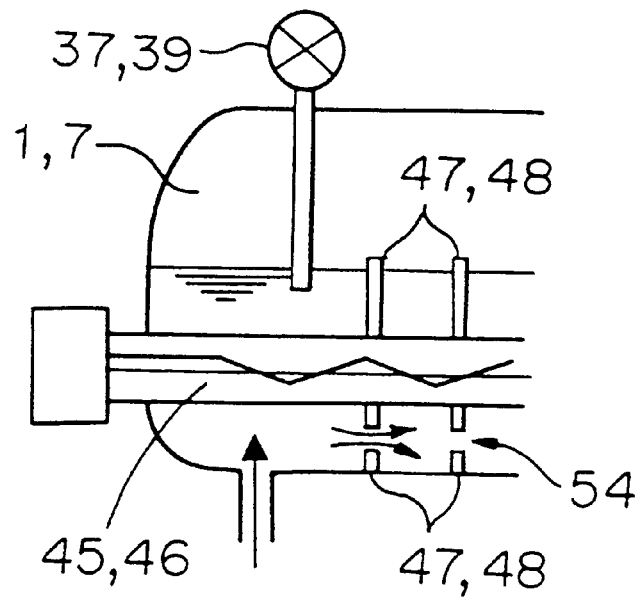
FIG. 2 is an enlarged cross-sectional view showing a portion of the system with baffle plates.

In FIG. 1 is shown the system for continuously reprocessing waste sulfuric acid liquid according to an embodiment of the present invention. The system includes a tank for supply material 16, a heating vessel for concentration 1 connected to the tank for supply material 16, a packed column 2 connected to the heating vessel for concentration 1, and a partial condenser 3 connected to the packed column 2. The system also includes a condenser 4 connected to the partial condenser 3, a condensed liquid receiving tank 5 connected to the condenser 4, and a condensed liquid removing tank 6 connected to the condensed liquid receiving tank 5. The system also includes a connecting pipe 12 connected to the heating vessel for concentration 1, a heating vessel for distillation 7 connected to the connecting pipe 12, and a packed column 8 connected to the heating vessel for distillation 7. The system also includes a condenser for distillation 9 connected to the packed column 8, a condensed sulfuric acid receiving tank 10 connected to the condenser for distillation 9, and a condensed sulfuric acid removing tank 11 connected to the condensed sulfuric acid receiving tank 10. The system also includes a product collection tank 17 connected to the condensed sulfuric acid removing tank 11, a sulfuric acid concentration detector 41 connected to the product collection tank 17, and a removing pump 43 connected to the product collection tank 17. The system also includes a waste sulfuric acid cooler 13 connected to the heating vessel for distillation 7, a waste sulfuric acid receiving tank 14 connected to the waste sulfuric acid cooler 13, and a waste sulfuric acid removing tank 15 connected to the waste sulfuric acid receiving tank 14. The system also includes an evacuation device 20 which is connected to the condenser 4, the condensed liquid receiving tank 5, the condensed liquid removing tank 6, the condenser for distillation 9, the condensed sulfuric acid receiving tank 10, the condensed sulfuric acid removing tank 11, the waste sulfuric acid receiving tank 14 and the waste sulfuric acid removing tank 15 to evacuate these devices. The system also includes a liquid level measuring device 37 which measures the liquid level of the sulfuric acid liquid in the heating vessel for concentration 1 and which provides measurement to a waste sulfuric acid supply valve 42 to regulate the supply of the waste sulfuric acid liquid. The system also includes a temperature measuring device 38 which measures the temperature in the heating vessel for concentration 1 and which provides measurement with respect to the concentrated sulfuric acid temperature to a heating device 45 in the heating vessel for concentration 1 to regulate the temperature of the waste sulfuric acid liquid in the heating vessel 1. The system also includes a liquid level measuring device 39 which measures the liquid level of the sulfuric acid liquid in the heating vessel for distillation 7 and which provides liquid level measurement to the waste sulfuric acid supply valve 42 to regulate the supply of the waste sulfuric acid liquid. The system also includes a temperature measuring device 40 which measures the temperature in the heating vessel for distillation 7 and which provides concentrated sulfuric acid temperature measurement to a heating device 46 in the heating vessel for distillation 7 to regulate the evaporation quantity of the concentrated sulfuric acid liquid in the heated vessel 7. The system also includes a controller 21 which regulate the removal of the product based on concentration measurement measured by the concentrative measuring device 41.

The heating vessel for concentration 1 is elongated in a horizontal direction, and has one side formed with a liquid inlet and a bottom on the opposite side formed with a liquid outlet. The heating vessel for concentration 1 has a heater as the heating device 45 arranged therein. As the heater is used e.g. an electric heater, the heating temperature of which is controlled by a control signal from the controller 21. The heating vessel for concentration 1 have a plurality of baffle plates 47 arranged therein in a vertical position. The heating vessel for concentration has an upper portion therein provided with the packed layer 2 with a packing material such as Raschig ring filled therein, preventing sprays of sulfuric acid from reaching the condenser 4. In order to wet the packing material with condensed liquid so as to enhance an effect to catch the sprays, the partial condenser 3 is provided above the packed layer 2 to condense part of vapor and return the condensed liquid to the packed layer 2.

In order to restrain agitation of the liquid without preventing vapor generated in the heating vessel for concentration 1 from being led into the packed column 2, it is preferable that the baffle plates 47 have e.g. a height to cover substantially a lower half portion in the heating vessel for concentration 1 and that the baffle plates have holes 54 to pass the liquid so as to prevent flows of the liquid from stopping. When the baffle plates 47 have such a height to cover substantially the lower half portion in the heating vessel for concentration 1, it is preferable that the liquid level in the heating vessel for concentration 1 is kept at a position near to upper edges of the baffle plates.

The heating vessel for distillation 7 is elongated in a horizontal direction, and has one side formed with a liquid inlet and a bottom on the opposite side formed with a liquid outlet. The heating vessel for distillation 7 has a heater as the heating device 46 arranged therein. As the heater is used e.g. an electric heater, the heating power of which is controlled by a control signal from the controller 21. The heating vessel for distillation 7 has a plurality of baffle plates 48 arranged in a vertical position therein. The heating vessel for distillation has an upper portion therein provided with the packed layer 8 with a packing material such as Raschig ring filled therein, preventing sprays of sulfuric acid from reaching the condenser for distillation 9. In order to wet the packing material with condensed liquid so as to enhance an effect to catch the sprays, a return pipe 44 is arranged above the packed layer 8 to return part of the condensed liquid to the packed layer.

In order to restrain agitation of the liquid without preventing vapor generated in the heating vessel for distillation 7 from being led into the packed column 8, it is preferable that the baffle plates 48 have a height to cover substantially a lower half portion in the heating vessel for distillation 7 and that the baffled plates have holes 54 to pass the liquid so as to prevent flows of the liquid from stopping. When the baffled plates 48 have such a height to cover substantially the lower half portion in the heating vessel for distillation 7, it is preferable that the liquid level in the heating vessel for distillation 7 is kept at a position near to upper edges of the baffle plates.

The condensed liquid receiving tank 5 is provided with a detector 22 to detect whether a predetermined quantity of the liquid has been stored. The controller 21, which receives signals from the detector, controls the opening and closing operation of respective valves in a liquid inlet, a liquid outlet, a gas inlet and a gas outlet of the condensed liquid removing tank 6 in a preset order.

The condensed sulfuric acid receiving tank 10 is provided with a detector 27 to detect whether a predetermined quantity of the liquid has been stored. The controller 21, which receives signals from the detector, controls the opening and closing operation of respective valves in a liquid inlet, a liquid outlet, a gas inlet and a gas outlet of the condensed sulfuric acid removing tank 11 in a preset order.

The concentration measuring device 41 is connected to the product collection tank 17, and measures the concentration of the reprocessed sulfuric acid and transmits measurement to the controller 21. The controller 21 which receives the measurement from the concentration measuring device compares the measurement with a preset sulfuric acid concentration value, and operates the removing pump 43 and controls the opening and closing operation of switching valves 18 and 19 for removal of the product.

The waste sulfuric acid cooler 13 is provided with a pipe 50 connecting to the heating vessel for distillation 7, and a pipe 50 connecting to the waste sulfuric acid receiving tank 14. The latter pipe 50 has a restrictor using an overflow device 52 or a restricting plate 51 arranged therein to keep the flow rate of the waste sulfuric acid in a predetermined range.

The waste sulfuric acid receiving tank 14 is provided with a detector 32 to detect whether a predetermined quantity of the liquid has been stored. The controller 21, which receives signals from the detector, controls the opening and operating operation of respective valves in a liquid inlet, a liquid outlet, a gas inlet and a gas outlet of the waste sulfuric acid removing tank 15 in a preset order.

As the material for constituting the system is used a material which is incorruptible to sulfuric acid and vaporized sulfuric acid having a temperature near to 200° C. or higher and which has an enough strength to be operated with the inside of the system depressurized. It is preferable to use silica gas, borosilicate glass or fluorocarbon resin as the incorruptible material. When the system is constructed with these materials, it is preferable that the partial condenser 3, the condenser 4, the condenser for distillation 9 and the waste sulfuric acid cooler 13 are formed as a coiled heat exchanger or a multitubular heat exchanger.

The system for continuously reprocessing waste sulfuric acid liquid is continuously operated as follows: First, cool water flows through pipes in the partial condenser 3, the condenser 4, the condenser for distillation 9 and the cooler 13. The inside of the system is depressurized to about 10–20 Torr by the evacuation device 20. The controller 21 compares the liquid levels of the sulfuric acid liquid measured by the sulfuric acid liquid level sensors 37 and 39 with respective presets heights, and controls the opening and closing operation of the supply valve 42 to supply a suitable quantity of waste sulfuric acid liquid 53 as the supplied material from the tank for supplied material 16 to the heating vessel for concentration 1. The concentration for the supplied waste sulfuric acid liquid is usually about 80 wt % and mostly not higher than 90 wt %, a large portion of the impurities in the waste sulfuric acid liquid is water, and a small quantity of metallic components are contained in the waste sulfuric acid liquid. When the liquid level in the heating vessel for concentration 1 is raised, the concentrated sulfuric acid liquid passes through the connecting pipe 12 and is supplied to the heating vessel for distillation 7 as a continuous flow. When it is detected that the waste sulfuric acid liquid is supplied to the heating vessel for concentration 1 so as to have the predetermined height, the controller 21 compares the temperature measurement for the heating vessel for concentration with the preset temperature, and controls electric input power to the electric heater of the heating device for concentration 45.

When the waste sulfuric acid liquid 53 is heated to about 200° C. to increase the concentration to about 97 wt %, vapor is intensely generated. The vapor, which mostly consists of water, passes the packed column 2 to reduce the quantity of the sulfuric acid entrained on the vapor, and the vapor has part thereof condensed by the partial condenser 3. The condensed part returns to the packed column 2. The noncondensed part reaches the condenser 4, is condensed therein and flows into the condensed liquid receiving tank 5. When the condensed sulfuric acid liquid having a concentration of about 97 wt % is supplied to the heating vessel for distillation 7 through the connecting pipe 12, the controller 21 compares the liquid level of the sulfuric acid liquid measured by the sulfuric acid liquid level sensor 39 with the preset liquid level, and controls the electric input power to the electric heater of the heating device for distillation 46 to regulate the evaporation quantity of the concentrated sulfuric acid liquid.

When the concentrated sulfuric acid liquid has been heated to 210° C.–220° C., the addition of further heating causes the sulfuric acid liquid to be evaporated. The evaporated sulfuric acid passes through the packed column 8, and reduces sprays of the sulfuric acid entrained on the evaporated sulfuric acid therein. The evaporated sulfuric acid is condensed by the condenser for distillation 9, and flows into the condensed sulfuric acid receiving tank 10. Part of the condensed sulfuric acid returns to the packed column 8 through a return pipe 44 to wet the packing material, enhancing an effect to catch the sprays of the sulfuric acid. The waste sulfuric acid liquid goes out of the heating vessel for distillation 7, passes through the pipe 50 and is cooled to about a room temperature by the waste sulfuric acid cooler 13. The cooled waste sulfuric acid liquid has a flow rate regulated by the restricting plate 51 and the overflow device 52, and flows into the waste sulfuric acid receiving tank 14 with the quantity of the waste sulfuric acid liquid preferably regulated to not higher than 5% of the total quantity of the sulfuric acid liquid.

When the condensed liquid is supplied to the condensed liquid receiving tank 5, the controller 21 compares the liquid level of the condensed liquid measured by the liquid level sensor 22 with a preset liquid level. If the measured liquid level reaches the preset liquid level, the opening and closing operation of respective valves of the condensed liquid removing tank 6 is carried out as follows: First, a valve 24 is opened, a valve 23 is closed, a valve 25 is closed and a valve 26 is closed to make the pressure in the condensed liquid receiving tank equal to that in the condensed liquid receiving tank under a depressurized state. Next, the predetermined quantity of the condensed liquid which has been stored in the condensed liquid receiving tank is introduced into the condensed liquid removing tank by opening the valve 23, and then the valve 23 is closed. Next, the valve 24 is closed to avoid evacuation, the valve 25 is opened to introduce gas having pressure not less than normal pressure into the condensed liquid removing tank, and the valve 26 is opened to remove the liquid in the condensed liquid removing tank to a location under normal pressure. Next, the valve 26 is closed, the valve 25 is closed and the valve 24 is opened to bring in the same state as the initial state. Such processes are repeated to remove the condensed liquid from the apparatus for concentration under a depressurized state into the normally pressurized state. Such processes can remove the condensed liquid without stopping the concentration operation.

When the condensed sulfuric acid is supplied to the condensed sulfuric acid receiving tank 10, the controller 21 compares the liquid level of the condensed sulfuric acid measured by the liquid level sensor 27 with a preset liquid level. The measured liquid level is the same as the preset liquid level, the opening and closing operation of respective valves of the condensed sulfuric acid removing tank 11 is carried out as follows: First, a valve 29 is opened, a valve 28 is closed, a valve 30 is closed and a valve 31 is closed to make the pressure in the condensed sulfuric acid receiving tank equal to that in the condensed sulfuric acid receiving tank under a depressurized state. Next, the predetermined quantity of the liquid which has been stored in the condensed sulfuric acid receiving tank is introduced into the condensed sulfuric acid removing tank by opening the valve 28, and then the valve 28 is closed. Next, the valve 29 is closed to avoid evacuation, and the valve 30 is opened to introduce gas having pressure not less than normal pressure into the condensed sulfuric acid removing tank, and the valve 31 is opened to remove the liquid in the condensed sulfuric acid removing tank to a location under normal pressure. Next, the valve 31 is closed, the valve 30 is closed and the valve 29 is opened to bring in the same state as the initial state. Such processes are repeated to remove the condensed sulfuric acid from the apparatus for distillation under reduced pressure to the produce collection tank 17 under normal pressure. Such processes can remove the condensed sulfuric acid without stopping the distillation operation.

When the waste sulfuric acid liquid is supplied to the waste sulfuric acid receiving tank 14, the controller 21 compares the liquid level of the waste sulfuric acid liquid measured by the liquid level sensor 32 with a preset liquid level. When the measured liquid level is the same as the preset liquid level, the opening and closing operation of respective valves of the waste sulfuric acid removing tank 15 is carried out as follows: First, a valve 34 is opened, a valve 33 is closed, a valve 35 is closed and a valve 36 is closed to make the pressure in the waste sulfuric acid receiving tank equal to that in the waste sulfuric acid receiving tank under reduced pressure. Next, the predetermined quantity of the liquid which has been stored in the waste sulfuric acid receiving tank is introduced into the waste sulfuric acid removing tank by opening the valve 33, and then the valve 33 is closed. Next, the valve 34 is closed to avoid evacuation, and the valve 35 is opened to introduce gas having pressure not less than normal pressure into the waste sulfuric acid removing tank, and the valve 36 is opened to remove the liquid in the waste sulfuric acid removing tank to a location under normal pressure. Next, the valve 36 is closed, the valve 35 is closed and the valve 34 is opened to bring in the same state as the initial state. Such processes are repeated to remove the waste sulfuric acid liquid from the apparatus for distillation under reduced pressure to a location under normal pressure. Such operation can remove the waste sulfuric acid liquid without stopping the distillation operation.

When the reprocessed sulfuric acid liquid is supplied to the product collection tank 17, the controller 21 compares the measured concentration of the reprocessed sulfuric acid liquid measured by the concentration measuring device 41 with a preset concentration, and activates the removing pump 43 based on the comparison. If the reprocessed sulfuric acid liquid has sufficient concentration, the controller opens the valve 19 and closes the valve 18 to remove the reprocesses sulfuric acid liquid. If the reprocessed sulfuric acid liquid has insufficient concentration, the controller opens the valve 18 and closes the valve 19 to return the reprocessed sulfuric acid liquid to the supply material tank for reprocessing, decreasing loss of the sulfuric acid liquid.

When the apparatus for continuously reprocessing waste sulfuric acid liquid is continuously operated, the waste sulfuric acid liquid 53 which has been supplied to the inlet for the heating vessel for concentration 1 is intensely evaporated by heating. The boiling point of the waste sulfuric acid liquid varies depending on the concentration of the sulfuric acid. If the supplied sulfuric acid liquid has a concentration of about 85 wt % under about 15 Torr ($2 \times 10^3$ Pa), the liquid temperature near to the inlet of the heating vessel for concentration 1 is about 170° C., and the sulfuric acid concentration near to the inlet is about 94 wt %. Since the waste sulfuric acid liquid is heated passing through the plural baffle plates 47 to have the sulfuric acid concentration raised, the liquid temperature near to the outlet of the heating vessel for concentration 1 is about 200° C. and the sulfuric acid concentration near to the outlet is about 97 wt %. Since the sulfuric acid concentration gradient produced by the presence of the baffle plates is held even when the waste sulfuric acid liquid 53 is continuously supplied and the concentrated sulfuric acid liquid continuously flows out in the connecting pipe, the concentration operation can be carried out in a stable and continuous way. The greater the specific gravity of sulfuric acid is, the greater is the concentration of sulfuric acid is. Because the outlet of the heating vessel for concentration 1 is located at the bottom of the heating vessel, part of the sulfuric acid liquid at the bottom which has a greater specific gravity i.e. a greater concentration can be flowed out, improving stability in operation.

When about 97 wt % of the concentrated sulfuric acid liquid is supplied to the heating vessel for distillation 7 through the connecting pipe in the distillation operation, the concentrated sulfuric acid liquid which has flowed into the inlet of the heating vessel for distillation 7 and has a low impurity concentration of metallic components is heated passing through the plural baffle plates 48 to be mostly evaporated. Part of the sulfuric acid liquid, which has the impurity concentration raised, reaches a location near to the outlet of the heating vessel for distillation 7 and flows out as waste sulfuric acid liquid. Since the impurity concentration gradient produced by the presence of the baffle plates is held even when the concentrated sulfuric acid liquid is continuously supplied and the waste sulfuric acid liquid continuously flows out in the pipe 50, the distillation operation can be carried out in a stable and continuous way.

Figure 3:
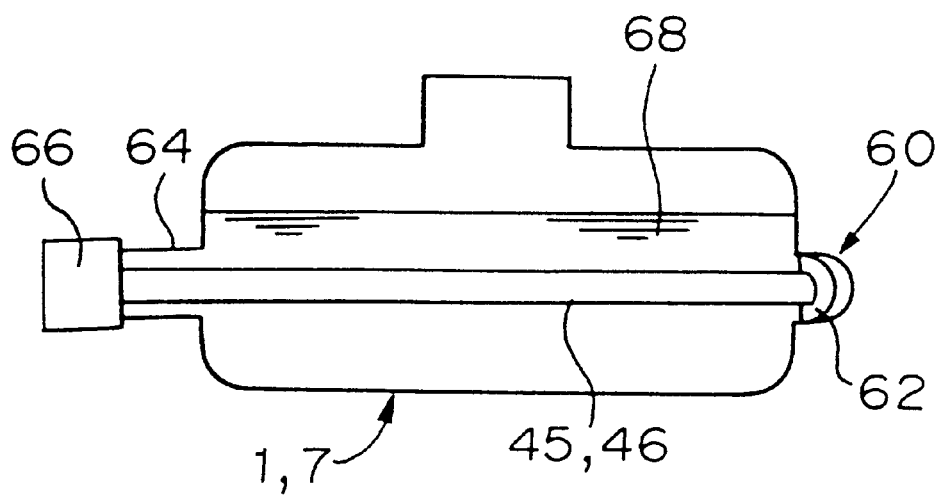
FIG. 3 is a cross-sectional view showing an embodiment of the heater supporting structure for a heating vessel made of glass according to the present invention.

In FIG. 3 is shown an embodiment of the heater supporting structure for a heating device made of glass according to the present invention. Explanation will be made with respect to a case wherein the embodiment is applied to the heating vessel for concentration 1 and the heating vessel for distillation 7 shown in FIG. 1. As shown in FIG. 3, the heater supporting structure is constituted by the heating vessel 1 or 7 made of glass, the heater 45 or 46 inserted into the heating vessel 1 or 7 through an inserting portion 64 thereof, a bulged portion 60 at leading edge of the heating vessel 1 or 7 opposite to the inserting portion 64, and a cushiony sheath 62 inserted in the bulged portion 60. The heater 45 or 46 has one end supported by a plug 66 for sealing the inserting portion 64 of the heating vessel 1 or 7 and the other end supported by the bulged portion 60 of the heating vessel 1 or 7 through the cushiony sheath 62.

As explained, in accordance with the heater supporting structure for a heating device made of glass according to the present invention, the heater 45 or 46 inserted in the heating vessel 1 or 7 made of glass is supported by two locations of the inserting portion 64 and the leading edge of the heating vessel 1 or 7 formed as the bulged portion 60. Stress concentration to the supporting portion for the heater 45 or 46 due to vibration of the liquid 68 in the heating vessel 1 or 7 or vibration of the heating vessel per se can be remarkably reduced in comparison with cantilevered supporting. This arrangement allows a long heater 45 or 46 to be inserted, the possibility of breakage to vibration of the liquid 68 in the heating vessel 1 or 7 and vibration of the heating vessel per se can be reduced, permitting intense heating to be carried out.

In accordance with the present invention, the heating vessel for concentration is formed in an elongated heating vessel, and the baffle plate is arranged in the heating vessel, gradually increasing the concentration of the sulfuric acid liquid entered the inlet at a low concentration, stabilizing the sulfuric acid concentration at the outlet at a high concentration. The outlet for removing the concentrated sulfuric acid liquid is formed at the lower portion of the heating vessel for concentration to prevent a case wherein slightly low concentration of part of the sulfuric acid liquid near to the liquid level in the heating vessel mixes with part thereof near to the lower portion so as to reduce the concentration of the removed sulfuric acid liquid. Thus, the sulfuric acid concentration at the outlet can be prevented from being unstable.

The elongated heating vessel as the heating vessel for distillation is installed so that the sulfuric acid liquid level of the apparatus for concentration is the same as the liquid level in the apparatus for distillation. As a result, the sulfuric acid liquid can be continuously flowed by connecting the heating vessel for concentration to the heating vessel for distillation without presence of a valve or an intermediate tank in the connecting pipe. The heating vessel for distillation is formed in an elongated heating vessel, and the baffle plate is arranged in the heating vessel for distillation to gradually increase the impurity concentration of a nonvolatile component included in the concentrated sulfuric acid liquid from the inlet toward the outlet, stably keeping the impurity concentration at the outlet at a high level.

The outlet for removing the waste sulfuric acid liquid is arranged at the lower portion of the heating vessel for distillation, preventing a case wherein part of the sulfuric acid liquid which is located near to the liquid level of the sulfuric acid liquid in the heating vessel and has slightly low impurity concentration of the nonvolatile component mixes with part thereof near to the lower portion to reduce the impurity concentration in the waste sulfuric acid liquid so as to make the concentration of the removed sulfuric acid liquid unstable. Since the condensed liquid removing tank, the condensed sulfuric acid removing tank and the waste sulfuric acid removing tank have the respective liquid inlet valve, the liquid outlet valve, the gas inlet valve and the gas outlet valve, these valves can be opened and closed in the preset manner by the controller to remove the condensed liquid, the condensed sulfuric acid and the waste sulfuric acid liquid from a state under reduction pressure to a state under normal pressure without stopping the continuous concentration operation and the continuous distillation operation.

When the concentration for the reprocessed sulfuric acid liquid which has reached the product collection tank is lower than the preset value, the presence of the pipe and the switching valve for returning the reprocessed sulfuric acid liquid to the supply material tank allows that sulfuric acid liquid to be used as supply material without stopping the system. The conventional system can not carry out continuous reprocessing, and carries out reprocessing in a batch manner, bringing about a drop in rate of operation due to stopping and restarting. The conventional system which is operated under normal pressure to carry out continuous reprocessing brings about the occurrence of repairing expense due to leakage of sulfuric acid or breakage of the system, or a drop in rate of operation. However, the system and method for continuously reprocessing waste sulfuric acid liquid according to the present invention can offer an advantage in that reprocessed sulfuric acid liquid can be provided in a stable and continuous way.

In accordance with the present invention, when the heater is inserted into the heating vessel made of glass, the heater is supported by two locations or more of the inserting portion and another portion to reduce stress concentration to the heater supporting portion due to vibration of the liquid in the heating vessel and vibration of the heating vessel per se in comparison with cantilevered supporting. This arrangement allows a long heater to be inserted and the possibility of breakage due to vibration of the liquid in the heating vessel and vibration of the heating vessel per se to be reduced, permitting intense heating to be carried out. Since the conventional cantilevered supporting structure requires that a short heater be used to avoid breakage, slow heating be carried out to prevent the liquid in the heating vessel from vibrating or intense heating be carried out with ready for breakage, the heating vessel must be made large, or repairing or exchanging parts is periodically required. However, the heater supporting system according to the present invention can offer an advantage in that a small size heating vessel made of glass and having high heating capacity can be provided.

What is claimed is:

1. A heater supporting structure for a heating device, comprising:
    a heating vessel made of glass; and
    a heater inserted in the heating vessel;
        wherein the heater is supported at two locations of a heater inserting portion of the heating vessel and a location thereof so as to avoid breakage,
        wherein a leading edge of the heater opposite to the heater inserting portion is inserted in and supported by a bulged portion of the heating vessel.

2. The heater supporting structure according to claim 1, wherein the bulged portion has a cushiony sheath put therein, and the leading edge is inserted into the sheath.

3. The heater supporting structure according to claim 2, wherein the cushiony sheath is made of PTFE or other fluorocarbon resin.

* * * * *

UNITED STATES PATENT AND TRADEMARK OFFICE
CERTIFICATE OF CORRECTION

PATENT NO. : 6,477,323 B2
DATED : November 5, 2002
INVENTOR(S) : Koizumi et al.

It is certified that error appears in the above-identified patent and that said Letters Patent is hereby corrected as shown below:

Title page, Item[54] and Column 1, lines 1-5,
should read:
-- [54]  SYSTEM AND METHOD FOR CONTINUOUSLY REPROCESSING WASTE SULFURIC ACID LIQUID, AND HEATER SUPPORTING STRUCTURE FOR A HEATING VESSEL MADE OF GLASS --

Title page,
Item [73], Assignee, should read:
-- [73] Assignees: Asahi Techno Glass Corporation, Funabashi (JP); Fujitsu Limited, Kawasaki [JP] --

Signed and Sealed this

Third Day of June, 2003

JAMES E. ROGAN
*Director of the United States Patent and Trademark Office*